(12) United States Patent
Tohyama (10) Patent No.: US 7,541,583 B2
(45) Date of Patent: Jun. 2, 2009

(54) INFRARED DETECTING APPARATUS AND INFRARED IMAGING APPARATUS USING THE SAME

(75) Inventor: Shigeru Tohyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/723,142

(22) Filed: Mar. 16, 2007

(65) Prior Publication Data

US 2007/0215807 A1 Sep. 20, 2007

(30) Foreign Application Priority Data

Mar. 17, 2006 (JP) .............................. 2006-075122

(51) Int. Cl.
*G01J 5/00* (2006.01)

(52) U.S. Cl. .................................................. 250/338.1

(58) Field of Classification Search .............. 250/338.1, 250/332
See application file for complete search history.

(56) References Cited

U.S. PATENT DOCUMENTS 5,300,915 A * 4/1994 Higashi et al. ............ 338/22 R
6,133,572 A 10/2000 Cunningham

FOREIGN PATENT DOCUMENTS

DE 102 56 997 A1 12/2003
EP 1 359 400 A1 11/2003
JP 2004-527731 9/2004

OTHER PUBLICATIONS

R.A. Wood, "High-Performance Infrared Thermala Imaging with Monolithle Sillicon Focal Planes Operating at Room Temperature", Technical Digest of International Electron Devices Meeting, pp. 175-177, 1993 IEEE.
European Search Report dated Jul. 6, 2007, not a publication.
Shie, Jin-Shown and Weng, Ping Kuo, "Design considerations of metal-film bolometer with micromachined floating membrane", Institute of Electro-Optical Engineering, Sensors and Actuators, No. 3, Jun. 1992, pp. 183-189.
Fujitsuka, Norio, et al., "Monolithic pyroelectric infrared image sensor using PVDF thin film", Elsevier Science S.A., 1998, pp. 237-243.

* cited by examiner

*Primary Examiner*—Constantine Hannaher
(74) *Attorney, Agent, or Firm*—McGinn IP Law Group, PLLC (57) ABSTRACT

An infrared detecting apparatus includes: a substrate; an infrared detector which detects infrared radiation; a first supporting member which extends between the infrared detector and the substrate, and which supports the infrared detector apart from the substrate; a second supporting member which extends between the infrared detector and the substrate, and which supports the infrared detector apart from the substrate; and a plurality of wirings which extend between the infrared detector and the substrate, and which are all provided to the first supporting member.

18 Claims, 4 Drawing Sheets

INFRARED DETECTING APPARATUS AND INFRARED IMAGING APPARATUS USING THE SAME

BACKGROUND OF THE INVENTION

1. Field of the Invention

The present invention relates to an infrared detecting apparatus having a thermal isolation structure, and to an infrared imaging apparatus using the infrared detecting apparatus.

2. Description of the Related Art

A basic and representative example of a thermal isolation structure, which is most frequently used in practice for a thermal infrared solid state imaging device, is disclosed in a report by R. A. Wood (Technical Digest of International Electron Devices Meeting, pp. 175-177 (1993)), the entire contents of which are incorporated herein by reference.

Figure 4:
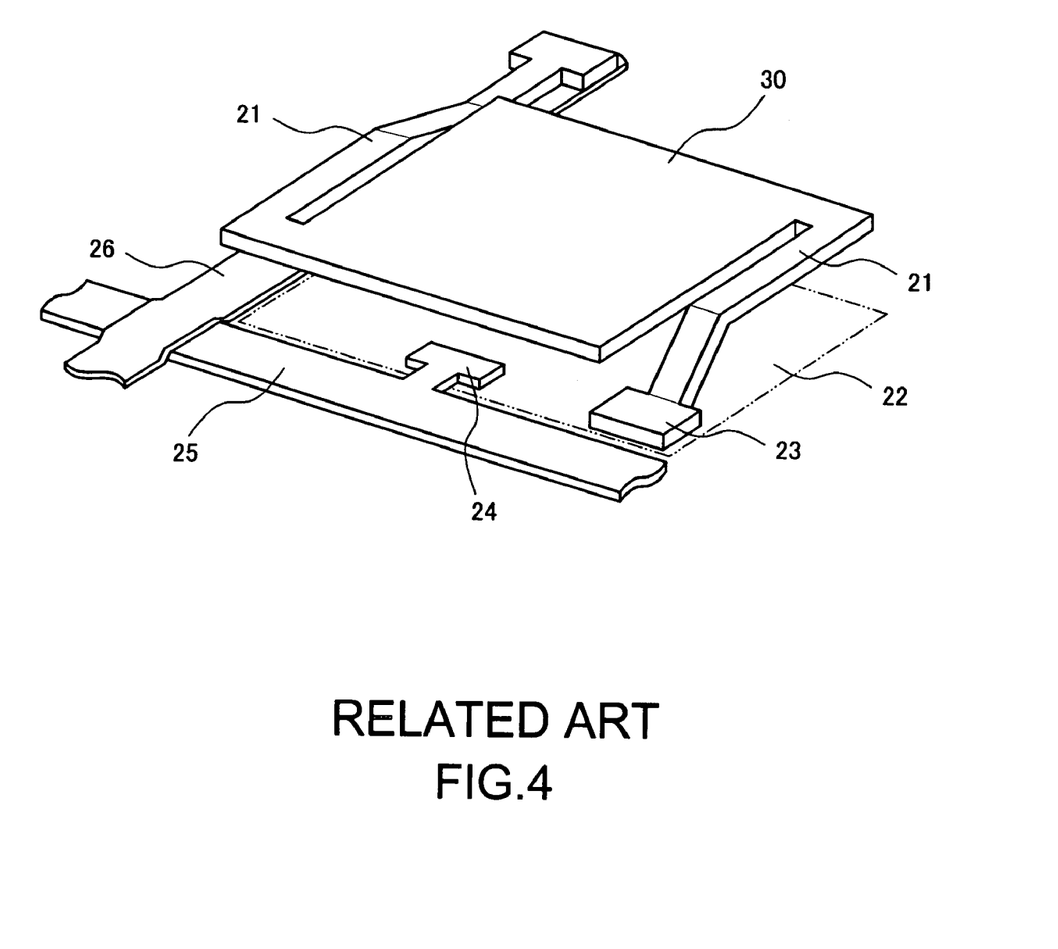
FIG. 4 is a perspective view of an infrared detecting apparatus disclosed in a report by R. A. Wood.

As shown in FIG. 4, a diaphragm 30, which is a photodetector element, is supported with two supporting legs 21 in a way that the diaphragm 30 is suspended in the air above the silicon substrate in which a transistor 22 is formed. The diaphragm 30, the supporting legs 21 and the transistor 22 form an infrared detecting apparatus. Each of the diaphragm 30 and the supporting legs 21 is made of silicon nitride of 0.5 μm thick. A temperature-sensitive resistor is disposed inside the diaphragm 30. The temperature-sensitive resistor is made of a thin polycrystalline semiconductor film of approximately 1000 Å (or 100 nm) thick.

A plurality of infrared detecting apparatuses are formed in the silicon substrate, and each of the infrared detecting apparatuses is used for one pixel. The silicon substrate is provided with a processing circuit which processes image signals outputted from all pixels. Each pixel is provided with one of the transistors 22 which perform switching. A switching signal is fed to a base 24 of each of the transistors 22 by metal wiring 25.

One of the supporting legs 21 extends from a part where an emitter 23 of the transistor 22 is formed. The other supporting leg 21 extends from metal wiring 26 orthogonal to the metal wiring 25. The temperature-sensitive resistor in the diaphragm 30 is connected to the emitter 23 and the metal wiring 26 by thin-film metal wirings provided to the two supporting legs 21. Accordingly, the supporting legs 21 are each provided with one thin-film metal wiring.

If only one supporting leg is used to support the diaphragm, the number of supporting legs is the minimum. This construction is suggested in Japanese Patent Translation Publication No. 2004-527731 (see claim 1 of this publication).

In order to improve sensitivity of an infrared imaging apparatus, it is often the case where the amount of heat flowing out of the supporting leg is reduced. The inventor has compared the amount of outflowing heat in the case where only one supporting leg supports the diaphragm, with the amount of outflowing heat in the case where two supporting legs support the diaphragm. The result of this comparison has shown that, in principle, supporting with two supporting legs makes it possible to reduce the amount of outflowing heat as compared with supporting with only one supporting leg (see FIGS. 3A to 3D).

Where a magnitude of moment is a product of a force which presses the diaphragm downward when gravity acts on the diaphragm, and a distance between the base of the supporting leg and the center of gravity of the diaphragm, it is considered that the magnitude of moment can be used as an index of strength which represents how strongly the supporting leg is deformed with the weight of the diaphragm. A cross-sectional area of the supporting leg required for suppressing deformation of the supporting leg is small when the magnitude of moment applied to the supporting leg is small. The amount of heat flowing out of the supporting leg decreases when the cross-sectional area of the supporting leg is made small. Thus, a smaller magnitude of moment makes it possible to reduce the amount of outflowing heat.

Figure 3A:
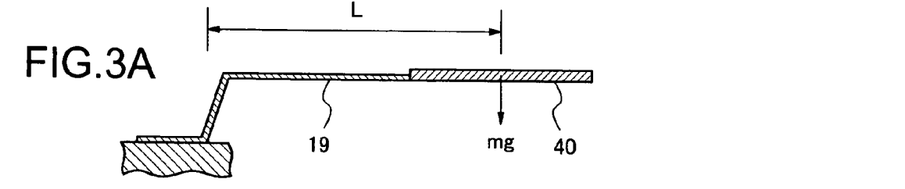
FIG. 3A is a schematic cross-sectional view of an infrared detecting apparatus of a one-legged type.

FIG. 3A shows an infrared detecting apparatus (of a one-legged type) in which only one supporting leg supports a diaphragm. In FIG. 3A, m denotes the mass of a diaphragm 40, g denotes gravitational acceleration, and L denotes a distance between the base of a supporting leg 19 and the center of gravity of the diaphragm 40. The magnitude $M_1$ of moment is obtained by Expression (1).

$$M_1 = mgL \quad (1)$$

Figure 3B:
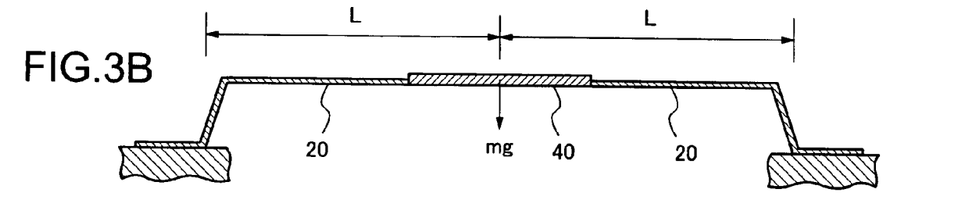
FIG. 3B is a schematic cross-sectional view of an infrared detecting apparatus of a two-legged type.

FIG. 3B shows an infrared detecting apparatus (of a two-legged type) in which two supporting legs support the diaphragm. In FIG. 3B, the diaphragm 40, of which mass is indicated by m, is supported with two supporting legs 20. The distance between the base of each supporting leg 20 and the center of gravity of the diaphragm 40 is indicated by L as is the case with one-legged type. The magnitude of moment which each supporting leg 20 needs to withstand is indicated by $M_2$.

$$M_2 = M_1/2 = mgL/2 \quad (2)$$

When Expression (2) is satisfied, it can be considered that the lower limit of the amount of outflowing heat in the one-legged type is equal to that in the two-legged type. The reason is that the cross-sectional area of the supporting leg 19 of the one-legged type required for suppressing deformation thereof due to the moment is equal to the sum of the cross-sectional areas of the respective supporting legs 20 of the two-legged type required for suppressing deformation thereof due to the moment.

$$M_2 > mgL/2 \quad (3)$$

When Expression (3) is satisfied, the amount of outflowing heat can be reduced more in the one-legged type than in the two-legged type.

$$M_2 < mgL/2 \quad (4)$$

When Expression (4) is satisfied, the amount of outflowing heat can be reduced more in the two-legged type than in the one-legged type.

To clarify which of Expressions (2) to (4) is satisfied, magnitude $M_2'$ of moment applied to each of supporting legs 20 in a case where two supporting legs 20 are used to respectively support two equal parts (see FIG. 3C) into which the diaphragm 40 of the two-legged type is cut is compared to each of the magnitudes $M_1$ and $M_2$ of moments in the case of the one-legged and two-legged types.

Figure 3C:
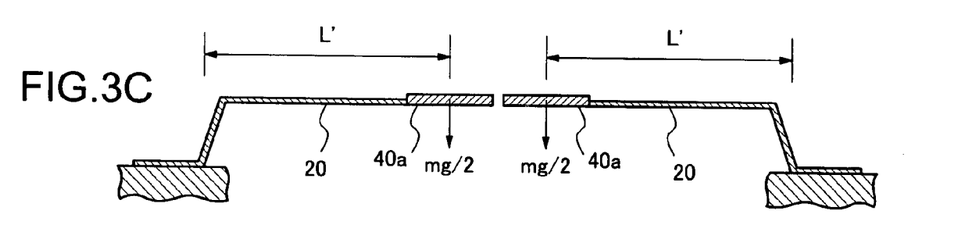
FIG. 3C is a schematic cross-sectional view of an infrared detecting apparatus such that the diaphragm of the infrared detecting apparatus of the two-legged type is cut into two equal parts.

First, the magnitude $M_2'$ of moment in the case shown in FIG. 3C is compared to the magnitude $M_1$ of moment in the case of the one-legged type. In the case of FIG. 3C, gravity acting on each of diaphragms 40a is mg/2. The center of gravity of each diaphragm 40a is located closer to the base of the supporting leg 20 supporting the diaphragm 40a than the center of gravity of the diaphragm 40 of the two-legged type (see FIG. 3B). In other words, a distance L' between each of the bases of the supporting legs 20 and the center of gravity of the diaphragm 40a supported with the supporting leg 20 is shorter than the distance L of the one-legged type, between base of the supporting leg 19 and the center of gravity of the diaphragm 40 supported with the supporting leg 19. Accordingly, the relationship between the magnitude $M_2'$ of moment applied to each supporting leg 20 in the case shown in FIG. 3C and the magnitude $M_1$ of moment applied to the supporting leg 19 of the one-legged type can be expressed by Expression (5) as given below.

$$M_2'=mgL/2<mgL/2=M_1/2 \quad (5)$$

Expression (5) indicates that the magnitude of moment, which each of the supporting legs 20 shown in FIG. 3C needs to withstand, is less than one half of the magnitude $M_1$ of moment applied to the supporting leg 19 of the one-legged type.

Figure 3D:
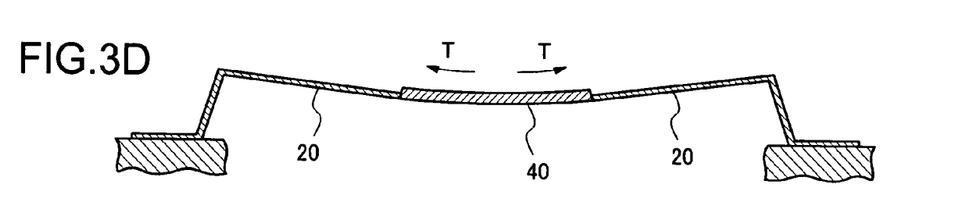
FIG. 3D is a schematic cross-sectional view of the infrared detecting apparatus of the two-legged type which is deformed.

Next, the magnitude $M_2'$ of moment in the case shown in FIG. 3C is compared to the magnitude $M_2$ of moment in the case of the two-legged type when moment is applied to each of the supporting legs 20 to deform. As shown in FIG. 3D, a reaction force T occurs when each supporting leg 20 of the two-legged type is deformed under the action of the applied moment. The reaction force T produces a restoring force which acts to suppress deformation in the supporting leg. Before the occurrence of the deformation, it can be considered that the magnitude $M_2$ of moment applied to each supporting leg 20 of the two-legged type is equal to the magnitude $M_2'$ of moment applied to each supporting leg 20 in the case shown in FIG. 3C. The moment applied to each supporting leg 20 of the two-legged type is reduced by the restoring force, and thereby the magnitude of moment which each supporting leg 20 of the two-legged type needs to withstand decreases correspondingly. Accordingly, the relationship between the magnitude $M_2'$ of moment applied to each supporting leg 20 in the case shown in FIG. 3C and the magnitude $M_2$ of moment applied to each supporting leg 20 of the two-legged type can be expressed by Expression (6) as given below.

$$M_2<M_2' \quad (6)$$

According to Expressions (5) and (6), a relationship among the magnitude $M_1$ of moment applied to the supporting leg 19 of the one-legged type, the magnitude $M_2$ of moment applied to each supporting leg 20 of the two-legged type, and the magnitude $M_2'$ of moment applied to each supporting leg 20 in the case shown in FIG. 3C can be expressed by Expression (7) as given below.

$$M_2<M_2'<M_1/2=mgL/2 \quad (7)$$

Expression (7) indicates that Expression (4) is satisfied. Accordingly, it can be concluded that it is possible to reduce the amount of outflowing heat more in the two-legged type than in the one-legged type.

Besides the deformation in the supporting leg due to the weight of the diaphragm, another problem arises. The problem is that a microstructure including the supporting leg and the diaphragm is deformed under residual stress during the manufacture of the infrared imaging apparatus. In a case of the one-legged type, the supporting leg deforms in a way that the greatest displacement occurs in a portion of the diaphragm positioned farthest from the base of the supporting leg. Deformation cannot be suppressed in the one-legged type because this type is not provided with means which reduces the displacement to position the diaphragm appropriately. Deformation can be suppressed in the two-legged type more than in the one-legged type because the two-legged type allows the portion of the diaphragm positioned farthest from the base of one supporting leg to be supported with the other supporting leg.

As mentioned above, the amount of outflowing heat can be reduced more in the two legged type than in the one-legged type. The supporting legs of the two-legged type, as shown in FIG. 4, are each provided with one thin-film metal wiring. A smaller width of the metal wirings leads to higher resistance of the metal wirings. The higher resistance of the metal wirings then leads to a lower rate of change in the resistance (change in temperature) of the temperature-sensitive resistor, to the sum of the resistance of the temperature-sensitive resistor operating at room temperature and the resistance of the metal wirings. For this reason, sensitivity of the temperature-sensitive resistor is lowered. Due to a trade-off relationship between the width of the supporting leg and the resistance of the metal wiring, the width of the supporting leg is relatively large so as to cause the resistance of the metal wiring to be relatively low. As a result, the amount of outflowing heat is large in the two-legged type, as shown in FIG. 4.

SUMMARY OF THE INVENTION

An object of the present invention is to provide an infrared detecting apparatus having high sensitivity, and an infrared imaging apparatus using the infrared detecting apparatus.

An infrared detecting apparatus according to one aspect of the present invention includes:

a substrate;

an infrared detector which detects infrared radiation;

a first supporting member which extends between the infrared detector and the substrate, and which supports the infrared detector apart from the substrate;

a second supporting member which extends between the infrared detector and the substrate, and which supports the infrared detector apart from the substrate; and a plurality of wirings which extend between the infrared detector and the substrate, and which are all provided to the first supporting member.

An infrared imaging apparatus according to another aspect of the present invention includes:

a substrate;

a plurality of infrared detectors which are arranged along the substrate, and which detect infrared radiation;

a plurality of first supporting members which support the infrared detectors apart from the substrate, respectively, and which extend from the substrate to respective infrared detectors;

a plurality of second supporting members which support the infrared detectors apart from the substrate, respectively, and which extend from the substrate to respective infrared detectors; and a plurality of bases which are fixed to the substrate, and one of which is connected to an end, at the substrate side, of the first supporting member supporting a first one of two adjacent infrared detectors, and to an end, at the substrate side, of the second supporting member supporting a second one of the two adjacent infrared detectors, wherein a plurality of wirings extend between each of the infrared detectors and the substrate, and all of the plurality of wirings are provided to the first supporting member which supports the infrared detector.

The infrared detecting apparatus and the infrared imaging apparatus are capable of reducing the amount of outflowing heat.

DETAILED DESCRIPTION OF THE EXEMPLARY EMBODIMENT

Figure 1:
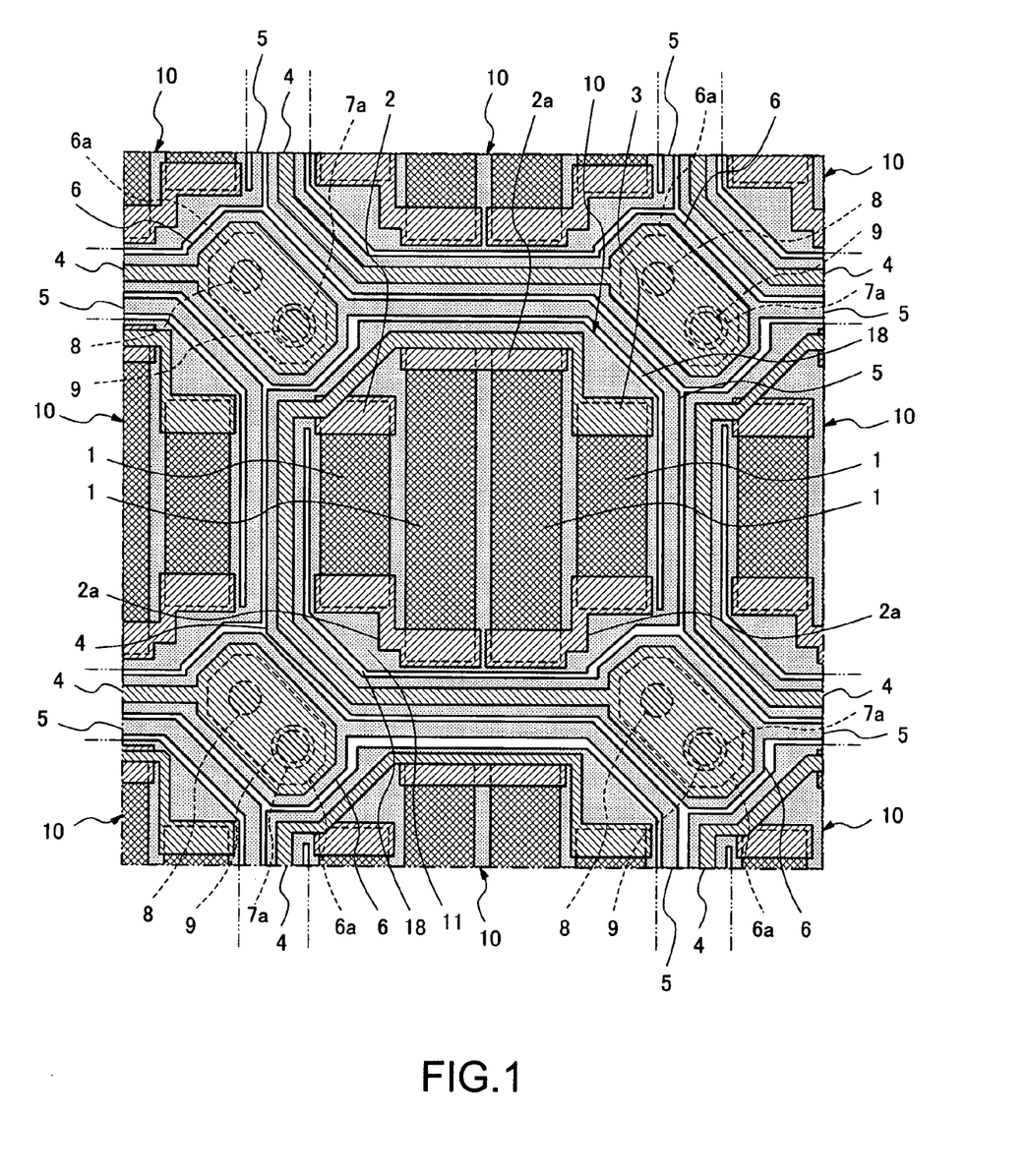
FIG. 1 is a plan view of an infrared imaging apparatus according to one embodiment of the present invention.
Figure 2:
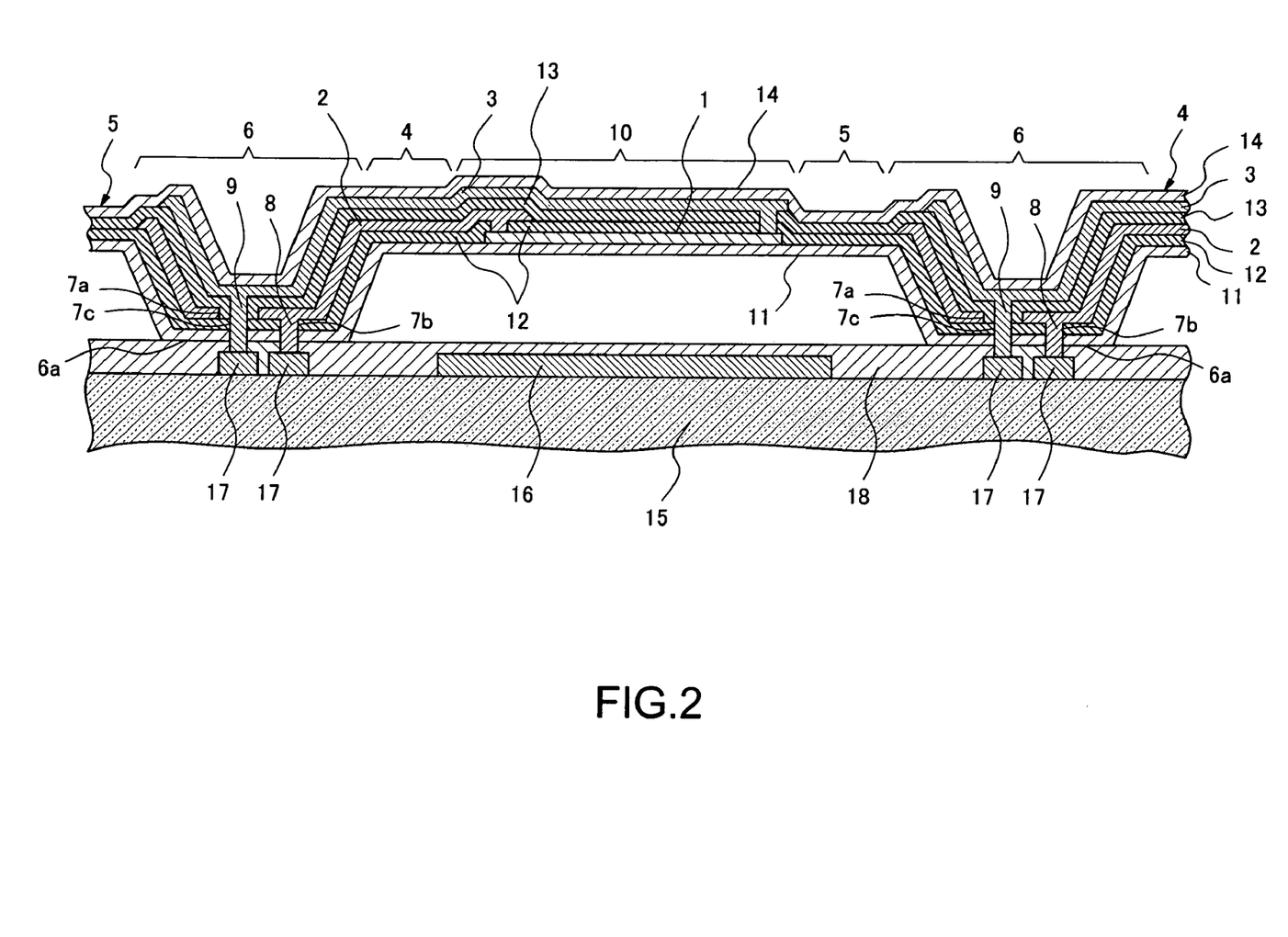
FIG. 2 is a schematic cross-sectional view of the infrared imaging apparatus according to the embodiment of the present invention.

An infrared imaging apparatus according to one embodiment of the present invention includes an array of plural infrared detecting apparatuses. Each of the infrared detecting apparatuses is used as one pixel. Referring to FIGS. 1 and 2, a diaphragm 10 in flat-plate shape included in each of the infrared detecting apparatuses is supported as suspended, with first and second supporting members 4 and 5, above one surface of a substrate 15 in which a processing circuit is formed. In other words, the first and second supporting members 4 and 5 extend between the diaphragm 10 and the substrate 15, and support the diaphragm 10 apart from the substrate 15. The first and second supporting members 4 and 5 extend along the periphery of the diaphragm 10. The substrate 15 is made of silicon.

The infrared imaging apparatus includes the plurality of diaphragms 10. The diaphragms 10 are disposed parallel to the substrate 15, and are arranged along the surface of the substrate 15. FIG. 1 shows a part of the infrared imaging apparatus. One diaphragm 10 is surrounded by eight diaphragms 10. A plurality of bases 6 are fixed to the substrate 15. One base 6 is surrounded by four diaphragms 10. The first and second supporting members 4 and 5 extend from the surface of the substrate 15 via the base 6. An end of the first supporting member 4 at the substrate 15 side and an end, of the second supporting member 5 at the substrate 15 side are connected to a common base 6. Here, the supporting member 4 supports one of the two adjacent diaphragms 10, and the supporting member 5 supports the other one of the two adjacent diaphragms 10. The common base 6 is disposed between the two adjacent diaphragms 10.

The diaphragm 10, the first and second supporting members 4 and 5 and the base 6 are formed of layered members. In FIG. 1, the layers are shown in hatch and other patterns to distinguish the layers from one another. Hatching does not represent a cross section. FIG. 2 illustrates schematically the order in which the layers are stacked.

The diaphragm 10 is provided with a plurality of thin-film bolometers 1, each of which is coated with an underlayer protective film 11 and an interlayer film 12. The interlayer film 12 is omitted in FIG. 1. Four thin-film bolometers 1 are provided in the embodiment. Each of the thin-film bolometers 1 forms a temperature sensor which detects temperature variations. Instead of the thin-film bolometer, a pn junction diode may form the temperature sensor. One diaphragm 10 and four thin-film bolometers 1 form an infrared detector which detects infrared radiation. Preferably, the thin-film bolometer 1 is made of vanadium oxide (such as $V_2O_3$ or $VO_x$) or titanium oxide ($TiO_x$) of approximately 30 nm to approximately 200 nm in film thickness. A metal reflecting mirror 16 is disposed on the substrate 15, as facing the diaphragm 10. The metal reflecting mirror 16 reflects infrared radiation.

The thin-film bolometers 1 are disposed in an array along the diaphragm 10. The array of the thin-film bolometers 1 extends throughout the entire area of the diaphragm 10. The four thin-film bolometers 1 are connected to one another in series with a plurality of wirings 2a, each of which is made of a conductive film. The number of the thin-film bolometers 1 is set so that the series-connected thin-film bolometers 1 have a desired resistance value.

The plurality of wirings extend between the infrared detector and the substrate 15. All of these wirings are provided to the first supporting member 4. Wirings are absent from the second supporting member 5. In the embodiment, the plurality of wirings consist of first and second wirings 2 and 3. The first wiring 2 made of a conductive film extends from a predetermined part of one of four thin-film bolometers 1 to a fixing region 6a via the first supporting member 4. The fixing region 6a is a region where the base 6 is fixed to the substrate 15. The second wiring 3 made of a conductive film extends from a different part of another of four thin-film bolometers 1 to fixing region 6a via the first supporting member 4. The second wiring 3 passes along the periphery of the diaphragm 10 so as to pass around the thin-film bolometers 1. The second wiring 3 is formed above the first wiring 2. An interlayer film 13 is formed between the first and second wirings 2 and 3. The interlayer film 13 is omitted in FIG. 1.

A plurality of electrodes 17 are disposed on the substrate 15 and are connected to the processing circuit formed in the substrate 15. The electrodes 17 are disposed in fixing region 6a. The first and second wirings 2 and 3 connects the infrared detector to the electrodes 17. The processing circuit processes a signal outputted from the infrared detector. The substrate 15 as well as the electrodes 17 and the metal reflecting mirror 16 on the substrate 15 is coated with a circuit protective film 18.

Parts, at the electrode side, the first and second wirings 2 and 3 are layered on the substrate 15. The layers of the first and second wirings 2 and 3 are included in base 6. Electrodes 17 are disposed underneath the base 6. The layer of the second wiring 3 above the first wiring 2 is connected to one of the electrodes 17 through a hole 7a formed in the layer of the first wiring 2 below the second wiring 3. Further, the second wiring 3 is connected to the electrode 17 through the hole 7c passed through the interlayer film 13, the interlayer film 12, the underlayer protective film 11 and the circuit protective film 18. The first wiring 2 is connected to other electrode 17 through a hole 7b passed through the interlayer film 12, the underlayer protective film 11 and the circuit protective film 18. The diaphragm 10, the first and second supporting members 4 and 5 and the base 6 are coated with an upperlayer protective film 14. The upperlayer protective film 14 is omitted in FIG. 1.

Preferably, the underlayer protective film 11, the interlayer films 12 and 13 and the upperlayer protective film 14 are each made of a silicon oxide film (SiO or $SiO_2$), a silicon nitride film (SiN or $Si_3N_4$) or a silicon oxynitride film (SiON), which has a film thickness of approximately 20 nm to approximately 800 nm. The interlayer film 12 may be omitted if the first wiring 2 has higher etching selectivity than the thin-film bolometer 1. Preferably, the first and second wirings 2 and 3 are each made of aluminum (Al), copper (Cu), gold (Au), titanium (Ti), tungsten (W) or molybdenum (Mo) film of approximately 10 nm to approximately 200 nm thick. Also preferably, the first and second wirings 2 and 3 may be each made of an alloy of titanium, aluminum and vanadium (TiAlV) or the like, or a semiconductor, such as highly-doped silicon (silicon with which impurities are doped in high concentrations).

To improve the sensitivity of the infrared detecting apparatus, it is required that the resistances of the first and second wirings 2 and 3 be minute as compared to the resistance of the thin-film bolometers 1. To this end, it is required that the widths of the films of the first and second wirings 2 and 3 within the first supporting member 4 be relatively large. The width of the first supporting member 4 (the cross-sectional dimensions of the first supporting member 4 as viewed in a direction parallel to the substrate 15) is larger than the widths of the films of the wirings. For example, when each of the widths of the films of the wirings is 1 μm, representative width of the first supporting member 4 is approximately 2 μm. If each of the first and second supporting members 4 and 5 is provided with one wiring as in the case of the infrared detecting apparatus disclosed in the report by R. A. Wood, the widths of the first and second supporting members 4 and 5 are each approximately 2 μm. In the embodiment, the width of the second supporting member 5 can be made small because wiring is not provided thereto. The first supporting member 4 is thicker than the second supporting member 5.

Thickness or width of second supporting member 5 supporting diaphragm 10 is set on the basis of the degree of deformation in the second supporting member 5 caused by at least one of the weight of the diaphragm 10 and residual stresses in the diaphragm 10 and in the first and second supporting members 4 and 5 supporting the diaphragm 10. The width of the second supporting member 5 is set so that deformation can be suppressed. Preferably, the thickness or the width of the second supporting member 5 is set on the basis of the degree of deformation in the second supporting member 5 caused both by the weight of the diaphragm 10 and by the residual stresses in the diaphragm 10 and in the first and second supporting members 4 and 5. As long as deformation in the second supporting member 5 is suppressed, the width of the second supporting member 5 is within a range of the width. More preferably, the width of the second supporting member 5 is minimized within the range of the width.

As mentioned above, the diaphragm 10 and the second supporting member 5 are formed of layered members. The underlayer protective film 11, the interlayer films 12 and 13 and the upperlayer protective film 14, which form the second supporting member 5, extend throughout both of the diaphragm 10 and the second supporting member 5. Increasing the thicknesses of the layers leads to an increase in the weight of the diaphragm 10 and to an increase in the residual stresses in the layers while the second supporting member 5 is made strong. Reducing the thicknesses of the layers leads to a reduction in the weight of the diaphragm 10 and to a reduction in the residual stresses in the layers while the second supporting member 5 is made weak. Accordingly, the minimum width of the second supporting member 5 does not depend on the thicknesses of the layers. To obtain the minimum width, the inventor has carried out experiments by using a typical apparatus for deposition. The minimum width obtained in the experiments is approximately 0.5 μm.

The amounts of outflowing heat in two infrared detecting apparatuses are compared with each other. Specifically, a wiring is provided separately to each of the first and second supporting members 4 and 5 in one of the infrared detecting apparatuses (hereinafter referred to as a "distributed-type infrared detecting apparatus"). The other infrared detecting apparatus is the one according to the embodiment. These infrared detecting apparatuses are provided with wirings having widths of 1 μm. As is apparent from the above, each of widths of supporting members with the wirings is approximately 2 μm. Here, each of the widths of supporting members with the wirings is set at 2 μm. Each of widths of supporting members without wiring is set at 0.5 μm, which is the minimum width obtained in the experiments performed by the inventor, as mentioned above. The thicknesses of the underlayer protective film 11, the interlayer film 12 and the upperlayer protective film 14 of the distributed-type infrared detecting apparatus are the same as those of the films 11, 12 and 14 of the infrared detecting apparatus according to the embodiment. The ratio of the amount of outflowing heat in the infrared detecting apparatus according to the embodiment to the amount of outflowing heat in the distributed-type infrared detecting apparatus is (2 μm+0.5 μm) to (2 μm+2 μm), that is, 0.625.

The area of the diaphragm 10 can be increased when the width of the second supporting member 5 is reduced. The area of the diaphragm 10 of the distributed-type infrared detecting apparatus is compared with the area of the diaphragm 10 of the infrared detecting apparatus according to the embodiment. The dimensions of the members of the infrared detecting apparatuses are set in the manner as mentioned above. A difference between the width of the second supporting members 5 of the distributed-type infrared detecting apparatus and the width of the infrared detecting apparatus according to the embodiment is 1.5 μm. The area of the diaphragm 10 of the infrared detecting apparatus according to the embodiment can be made larger than the area of the diaphragm 10 of the distributed-type infrared detecting apparatus, by the product of the length of the second supporting member 5, and the difference of 1.5 μm between the widths of the second supporting members 5. When the pitch of the pixels is approximately 30 μm (which is equal to the typical pitch of the pixels), the rate of increase in the area of the diaphragm 10 lies between about 13% and about 15%.

In the embodiment, two supporting members 4 and 5 are connected to one base 6. The infrared imaging apparatus according to the embodiment is compared with an infrared imaging apparatus in which two supporting members are respectively connected to two different bases as shown in FIG. 4. The area of one base 6 (to which two supporting members 4 and 5 are connected) of the infrared imaging apparatus according to the embodiment, as viewed in the normal direction of the substrate 15, is about 0.6 times the sum of the areas of two bases (each connected to one supporting member) of the infrared imaging apparatus such that is shown in FIG. 4, as viewed in the same direction (in a case where margin is about 1 μm around contact which connects wiring and electrode on the substrate). The area of the diaphragm 10 of the infrared detecting apparatus according to the embodiment can be made larger than that of the diaphragm of the infrared imaging apparatus such that is shown in FIG. 4, by the amount of reduction in the area of the base 6. When the pitch of the pixels is approximately 30 μm, the rate of increase in the area of the diaphragm 10 lies between about 9% and about 11%. The increase in the area of the diaphragm due to the reduction in the area of the base and in the width of the second supporting member as previously mentioned, makes it possible to improve the sensitivity of the infrared imaging apparatus by about 22% to about 26%.

The inventor fabricated an infrared imaging apparatus having 320×240 pixels and a 30 μm pixel pitch, in accordance with the above description of the embodiment. The width of the first supporting member 4 was 2 μm, and the width of the second supporting member 5 was 0.5 μm. The area of the base 6 was 54 μm². An aperture ratio was about 74%. The underlayer protective film 11, the interlayer film 12, the interlayer film 13 and the upperlayer protective film 14 were each made of a silicon oxynitride film and were respectively 200 nm, 50 nm, 150 nm and 200 nm in thickness, respectively. The sum total of the thicknesses of the films 11 to 14 was 600 nm. The thin-film bolometer 1 was made of a vanadium oxide film of 70 nm in thickness. Each of the wirings was made of films of titanium, aluminum and vanadium. Each of the first and second wirings 2 and 3 had width of 1 μm and thickness of 30 nm.

The inventor also fabricated a different infrared imaging apparatus in which a diaphragm was supported by two supporting members. The two supporting members were each provided with one wiring, and were respectively connected to two different bases. The different infrared imaging apparatus has 320×240 pixels and a 30-μm pixel pitch, as in the case of the infrared imaging apparatus fabricated as previously mentioned. The layers which form the different infrared imaging apparatus were identical to those of the infrared imaging apparatus fabricated as previously mentioned. Each of the two supporting members had a width of 2 μm. The sum total of the areas of the two bases used to support one diaphragm was 90 μm$^2$. The aperture ratio was about 60%. The aperture ratio of the infrared imaging apparatus fabricated in accordance with the description of the embodiment is larger by 23% (=(0.74/0.6−1)×100) than that of the different infrared imaging apparatus. The thickness of the underlayer protective film was 300 nm, and the thickness of the upperlayer protective film was 250 nm. The thickness of the interlayer film corresponding to the interlayer film 12 of the infrared imaging apparatus fabricated in accordance with the description of the embodiment was 50 nm. A member corresponding to the interlayer film 13 was not provided. The sum total of the thicknesses of these films was 600 nm. The dimensions of the thin-film bolometer and of conductive wiring were the same as those of the infrared imaging apparatus fabricated in accordance with the description of the embodiment. Materials for the thin-film bolometer and for the conductive wiring were also the same as those for the infrared imaging apparatus fabricated in accordance with the description of the embodiment.

Thermal conductance of the pixels was evaluated in order to compare the amounts of heat flowing out of the supporting members of the fabricated infrared imaging apparatuses. It was confirmed from the comparison that the amount of outflowing heat in the infrared imaging apparatus fabricated in accordance with the description of the embodiment decreases by about 30% as compared to the amount of outflowing heat in the different infrared imaging apparatus. In addition, it was confirmed that the sensitivity of the infrared imaging apparatus fabricated in accordance with the description of the embodiment is about 1.6 times that of the different infrared imaging apparatus. The reasons for the increase in the sensitivity of the apparatus were a decrease in the amount of outflowing heat and an increase in the aperture ratio.

The infrared imaging apparatus according to the embodiment described above may be adopted to a noctovision used in an infrared camera, thermography, or the like.

This application is based upon and claims the benefit of priority from the prior Japanese Patent Application No. 2006-075122, filed Mar. 17, 2006, the entire contents of which are incorporated herein by reference.

Additional advantages and modifications will readily occur to those skilled in the art. Therefore, the invention in its broader aspects is not limited to the specific details shown and described herein. Accordingly, various modifications may be made without departing from the spirit or scope of the general invention concept as defined by the appended claims and their equivalents.

What is claimed is:

1. An infrared detecting apparatus comprising:
   a substrate;
   an infrared detector which detects infrared radiation;
   a first supporting member which extends between the infrared detector and the substrate, and which supports the infrared detector apart from the substrate;
   a second supporting member which extends between the infrared detector and the substrate, and which supports the infrared detector apart from the substrate; and
   a plurality of wirings which extend between the infrared detector and the substrate, and which are all provided to the first supporting member,
   wherein the infrared detecting apparatus includes no more than two supporting members.

2. The infrared detecting apparatus according to claim 1, wherein the first supporting member is thicker than the second supporting member.

3. The infrared detecting apparatus according to claim 1, wherein the infrared detector includes a diaphragm and a temperature sensor provided to the diaphragm.

4. The infrared detecting apparatus according to claim 1, wherein each of the first and second supporting members includes an upperlayer protective film, an underlayer protective film, and at least one interlayer film disposed between the upperlayer protective film and the underlayer protective film.

5. The infrared detecting apparatus according to claim 4, wherein the plurality of wirings are disposed between the upperlayer protective film and the underlayer protective film of the first supporting member.

6. The infrared detecting apparatus according to claim 4, wherein the at least one interlayer film includes at least two interlayer films, and
   wherein the plurality of wirings are disposed between the at least two interlayer films of the first supporting member.

7. An infrared imaging apparatus comprising:
   a substrate;
   a plurality of infrared detectors which are arranged along the substrate, and which detect infrared radiation;
   a plurality of first supporting members which support the infrared detectors apart from the substrate, respectively, and which extend from the substrate to respective infrared detectors;
   a plurality of second supporting members which support the infrared detectors apart from the substrate, respectively, and which extend from the substrate to respective infrared detectors; and
   a plurality of bases which are fixed to the substrate, and one of which is connected to an end, at the substrate side, of the first supporting member supporting a first one of two adjacent infrared detectors, and to an end, at the substrate side, of the second supporting member supporting a second one of the two adjacent infrared detectors,
   wherein a plurality of wirings extend between each of the infrared detectors and the substrate, and all of the plurality of wirings are provided to the first supporting member which supports the infrared detector,
   wherein each of the plurality of infrared detectors includes no more than two supporting members.

8. The infrared imaging apparatus according to claim 7, wherein each of the first supporting members is thicker than the second supporting member which supports the infrared detector supported by the first supporting member.

9. The infrared imaging apparatus according to claim 7, wherein each of the infrared detectors includes a diaphragm and a temperature sensor provided to the diaphragm.

10. The infrared imaging apparatus according to claim 7, wherein each of the first and second supporting members includes an upperlayer protective film, an upperlayer protective film, and at least one interlayer film disposed between the upperlayer protective film and the underlayer protective film.

11. The infrared imaging apparatus according to claim 10, wherein the plurality of wirings are disposed between the upperlayer protective film and the underlayer protective film of the first supporting member.

12. The infrared imaging apparatus according to claim 10, wherein the at least one interlayer film includes at least two interlayer films, and
   wherein the plurality of wirings are disposed between the at least two interlayer films of the first supporting member.

13. An infrared imaging apparatus comprising:
   a plurality of infrared detectors which detect infrared radiation;
   a substrate in which a processing circuit processing signals outputted by the infrared detectors is formed;
   a plurality of electrodes provided to the substrate, and connected to the processing circuit;
   a plurality of first supporting members which extend from one surface of the substrate, which support the infrared detectors as suspended above the surface of the substrate, respectively, and each of which is provided with a plurality of wirings connecting the electrodes and the infrared detector supported by the first supporting member; and
   a plurality of second supporting members which extend from the surface of the substrate, which support the infrared detectors as suspended above the surface of the substrate, respectively, and from which wiring is absent,
   wherein each of the plurality of infrared detectors includes no more than two supporting members.

14. The infrared imaging apparatus according to claim 13, wherein each of the infrared detectors includes a diaphragm and a temperature sensor provided to the diaphragm.

15. The infrared imaging apparatus according to claim 14, wherein the plurality of wirings connected to each of the infrared detectors include a first wiring which extends from a predetermined part of the temperature sensor included in the infrared detector, and which is connected to one of the electrodes via the first supporting member supporting the infrared detector, and a second wiring which extends from a different part of the temperature sensor, and which is connected to another of the electrodes via the first supporting member, and
   at least one of the first and second wirings passes along the periphery of the diaphragm included in the infrared detector so as to pass around the temperature sensor.

16. The infrared imaging apparatus according to claim 13, wherein a plurality of bases are fixed to the substrate, and one of the bases is connected to an end, at the substrate side, of the first supporting member supporting a first one of two adjacent infrared detectors, and to an end, at the substrate side, of the second supporting member supporting a second one of the two adjacent infrared detectors.

17. The infrared imaging apparatus according to claim 16, wherein the plurality of electrodes are disposed in a region of the substrate where the bases are fixed to the substrate.

18. The infrared imaging apparatus according to claim 17, wherein parts, at the electrode side, of the plurality of wirings connected to a first of the plurality of infrared detectors are layered on the substrate, layers of the wirings are included in the base, electrodes are disposed underneath the base, and the layer of an upper wiring is connected to one of the electrodes through a hole formed in the layer of a lower wiring.

* * * * *